United States Patent
Chen et al.

(10) Patent No.: US 10,990,170 B2
(45) Date of Patent: Apr. 27, 2021

(54) EYE TRACKING METHOD, ELECTRONIC DEVICE, AND NON-TRANSITORY COMPUTER READABLE STORAGE MEDIUM

(71) Applicant: HTC Corporation, Taoyuan (TW)

(72) Inventors: Wei-Chen Chen, Taoyuan (TW); Yung-Chen Lin, Taoyuan (TW)

(73) Assignee: HTC Corporation, Taoyuan (TW)

( * ) Notice: Subject to any disclaimer, the term of this patent is extended or adjusted under 35 U.S.C. 154(b) by 96 days.

(21) Appl. No.: 16/354,202

(22) Filed: Mar. 15, 2019

(65) Prior Publication Data

US 2019/0286229 A1 Sep. 19, 2019

Related U.S. Application Data

(60) Provisional application No. 62/643,730, filed on Mar. 15, 2018.

(51) Int. Cl.
| | | |
|---|---|---|
| *G06K 9/00* | (2006.01) | |
| *G06F 3/01* | (2006.01) | |
| *G02B 27/00* | (2006.01) | |
| *G02B 27/01* | (2006.01) | |

(52) U.S. Cl.
CPC ......... *G06F 3/013* (2013.01); *G02B 27/0093* (2013.01); *G02B 27/0172* (2013.01); *G06K 9/00604* (2013.01); *G02B 2027/014* (2013.01); *G02B 2027/0138* (2013.01)

(58) Field of Classification Search
CPC combination set(s) only.
See application file for complete search history.

(56) References Cited

U.S. PATENT DOCUMENTS

| | | | |
|---|---|---|---|
| 2005/0175218 A1* | 8/2005 | Vertegaal | A61B 3/113 382/103 |
| 2006/0110008 A1* | 5/2006 | Vertegaal | G06T 7/251 382/103 |
| 2015/0278599 A1* | 10/2015 | Zhang | G06T 7/80 348/78 |
| 2018/0039846 A1* | 2/2018 | Grubb | G06K 9/00597 |

(Continued)

OTHER PUBLICATIONS

Jia-Bin HuangG et al., "Towards Accurate and Robust Cross-Ratio based Gaze Trackers Through Learning From Simulation", Eye Tracking Research and Applications, ACM, Mar. 26, 2014, pp. 75-82.

(Continued)

*Primary Examiner* — Iman K Kholdebarin
(74) *Attorney, Agent, or Firm* — CKC & Partners Co., LLC (57) ABSTRACT

An eye tracking method includes: constructing, by a processing circuit, an eye model; analyzing, by the processing circuit, a first head center position, according to a plurality of first pupil shape information and the eye model, wherein the plurality of first pupil shape information correspond to a plurality of first gazing vectors; capturing, by a camera circuit, a first image of the eye; analyzing, by the processing circuit, a determined gazing vector, according to the eye model and the first image; and adjusting, by the processing circuit, the first head center position according to an actual pupil shape information group and a plurality of simulated pupil shape information groups.

20 Claims, 8 Drawing Sheets (56) References Cited

U.S. PATENT DOCUMENTS

2019/0156100 A1* 5/2019 Rougeaux .............. A61B 3/113

OTHER PUBLICATIONS

Akihiro Tsukada et al., "Automatic Acquisition of a 3D Eye Model for a Wearable First-Person Vision Device", Proceedings of the Symposium on Eye Tracking Research and Applications, Jan. 1, 2012, pp. 213.
Perra David et al., "Adaptive eye-camera calibration for head-worn devices", 2015 IEEE Conference on Computer Vision and Pattern Recognition (CVPR), IEEE, 7 June 215, pp. 4146-4155.
Corresponding extended European search report dated Jun. 28, 2019.

* cited by examiner

EYE TRACKING METHOD, ELECTRONIC DEVICE, AND NON-TRANSITORY COMPUTER READABLE STORAGE MEDIUM

RELATED APPLICATIONS

This application claims priority to U.S. Provisional Application Ser. No. 62/643,730, filed Mar. 15, 2018, which is herein incorporated by reference.

BACKGROUND

Technical Field

The present disclosure relates to an electronic device and an eye tracking method. More particularly, the present disclosure relates to the electronic device and the eye tracking method in a head mount display (HMD).

Description of Related Art

Nowadays, eye tracking methods are used in various applications. For example, in virtual reality (VR) or augmented reality (AR) application, eye tracking methods are used in the VR/AR system to trace a user's gazing direction in order to provide corresponding reaction and/or control in the VR/AR environment.

SUMMARY

One aspect of the present disclosure is related to an eye tracking method. The eye tracking method includes constructing, by a processing circuit, an eye model; analyzing, by the processing circuit, a first head center position, according to a plurality of first pupil shape information and the eye model, wherein the plurality of first pupil shape information correspond to a plurality of first gazing vectors; capturing, by a camera circuit, a first image of the eye; analyzing, by the processing circuit, a determined gazing vector, according to the eye model and the first image; and adjusting, by the processing circuit, the first head center position according to an actual pupil shape information group and a plurality of simulated pupil shape information groups.

Another aspect of the present disclosure is related to an electronic device. In accordance with some embodiments of the present disclosure, the electronic device includes a camera, a processing circuit electrically connected to the camera, a memory electrically connected to the processing circuit, and one or more programs. The one or more programs are stored in the memory and configured to be executed by the processing circuit. The one or more programs including instructions for: constructing an eye model; analyzing a first head center position according to a plurality of first pupil shape information and the eye model, wherein the plurality of first pupil shape information correspond to a plurality of first gazing vectors; controlling the camera circuit to capture a first image of the eye; analyzing a determined gazing vector according to the eye model and the first image; and adjusting the first head center position according to an actual pupil shape information group and a plurality of simulated pupil shape information groups.

Another aspect of the present disclosure is related to a non-transitory computer readable storage medium. In accordance with some embodiments of the present disclosure, the non-transitory computer readable storage medium stores one or more programs including instructions, which when executed, causes a processing circuit to perform operations including: constructing an eye model; analyzing a first head center position according to a plurality of first pupil shape information and the eye model, wherein the plurality of first pupil shape information correspond to a plurality of first gazing vectors; controlling a camera circuit to capture a first image of the eye; analyzing a determined gazing vector according to the eye model and the first image; and adjusting the first head center position according to an actual pupil shape information group and a plurality of simulated pupil shape information groups.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiments, with reference made to the accompanying drawings as follows.

DETAILED DESCRIPTION

Reference will now be made in detail to the present embodiments of the disclosure, examples of which are illustrated in the accompanying drawings. Wherever possible, the same reference numbers are used in the drawings and the description to refer to the same or like parts.

It will be understood that, in the description herein and throughout the claims that follow, when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Moreover, "electrically connect" or "connect" can further refer to the interoperation or interaction between two or more elements.

It will be understood that, in the description herein and throughout the claims that follow, although the terms "first," "second," etc. may be used to describe various elements, these elements should not be limited by these terms. These terms are only used to distinguish one element from another. For example, a first element could be termed a second element, and, similarly, a second element could be termed a first element, without departing from the scope of the embodiments.

It will be understood that, in the description herein and throughout the claims that follow, the terms "comprise" or "comprising," "include" or "including," "have" or "having," "contain" or "containing" and the like used herein are to be understood to be open-ended, i.e., to mean including but not limited to.

It will be understood that, in the description herein and throughout the claims that follow, the phrase "and/or" includes any and all combinations of one or more of the associated listed items.

It will be understood that, in the description herein and throughout the claims that follow, words indicating direction used in the description of the following embodiments, such as "above," "below," "left," "right," "front" and "back," are directions as they relate to the accompanying drawings. Therefore, such words indicating direction are used for illustration and do not limit the present disclosure.

It will be understood that, in the description herein and throughout the claims that follow, unless otherwise defined, all terms (including technical and scientific terms) have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any element in a claim that does not explicitly state "means for" performing a specified function, or "step for" performing a specific function, is not to be interpreted as a "means" or "step" clause as specified in 35 U.S.C. § 112(f). In particular, the use of "step of" in the claims herein is not intended to invoke the provisions of 35 U.S.C. § 112(f).

Figure 1:
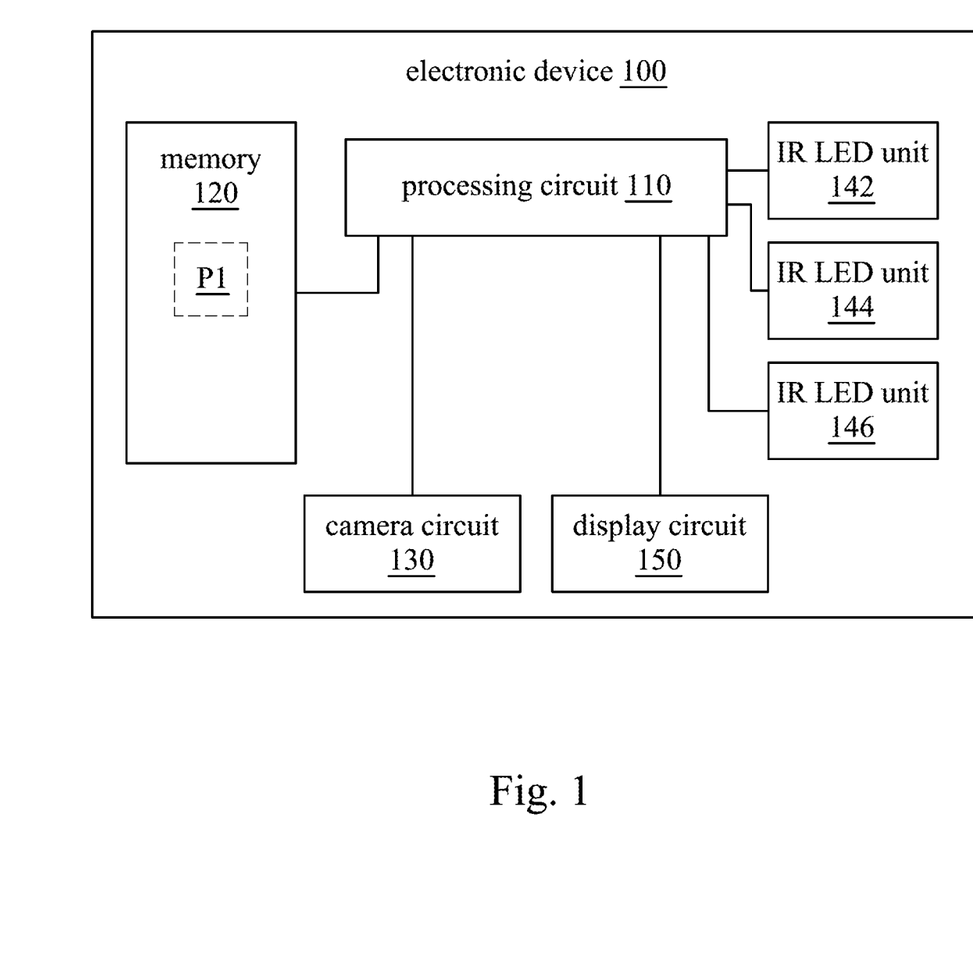
FIG. 1 is a schematic block diagram illustrating an electronic device in accordance with some embodiments of the present disclosure.

Reference is made to FIG. 1. FIG. 1 is a schematic block diagram illustrating an electronic device 100 in accordance with some embodiments of the present disclosure. The electronic device 100 may be configured to perform eye tracking to detect a gazing vector of user. Specifically, in some embodiments, the electronic device 100 may be applied in a virtual reality (VR)/mixed reality (MR)/augmented reality (AR) system. For example, the electronic device 100 may be realized by, a standalone head mounted device (HMD) or VIVE HMD. In detail, the standalone HMD or VIVE HMD may handle such as processing location data of position and rotation, graph processing or others data calculation.

As shown in FIG. 1, the electronic device 100 includes a processing circuit 110, a memory 120, a camera circuit 130, infrared light-emitting diodes (IR LED) units 142, 144, 146, and a display circuit 150. One or more programs P1 are stored in the memory 120 and configured to be executed by the processing circuit 110, in order to perform the eye tracking method.

The processing circuit 110 is electrically connected to the camera circuit 130. In some embodiments, the processing circuit 110 can be realized by, for example, one or more processors, such as central processors and/or microprocessors, but are not limited in this regard. In some embodiments, the memory 120 includes one or more memory devices, each of which includes, or a plurality of which collectively include a computer readable storage medium. The computer readable storage medium may include a read-only memory (ROM), a flash memory, a floppy disk, a hard disk, an optical disc, a flash disk, a flash drive, a tape, a database accessible from a network, and/or any storage medium with the same functionality that can be contemplated by persons of ordinary skill in the art to which this disclosure pertains.

In structural, the memory 120 is electrically connected to the processing circuit 110. The camera circuit 130 is configured to capture one or more images of an eye of the user, such that the processing circuit 110 may analyze the one or more images to perform eye tracking. In some embodiments, the camera circuit 130 may be realized by an infrared camera device. The one or more IR LED units 142, 144, 146 may be electrically connected to the processing circuit 110 and configured to provide one or more infrared rays, in which the image of the eye are captured by the infrared camera device using the one or more infrared rays. It is noted that, the embodiments shown in FIG. 1 is merely an example and not meant to limit the present disclosure. Alternatively stated, numbers, locations, and/or the arrangements of the IR LED units 142, 144, 146 may be adjusted based on the actual needs in various embodiments. The display circuit 150 is electrically connected to the processing circuit 110, such that the video and/or audio content displayed by the display circuit 150 is controlled by the processing circuit 110.

Figure 2:
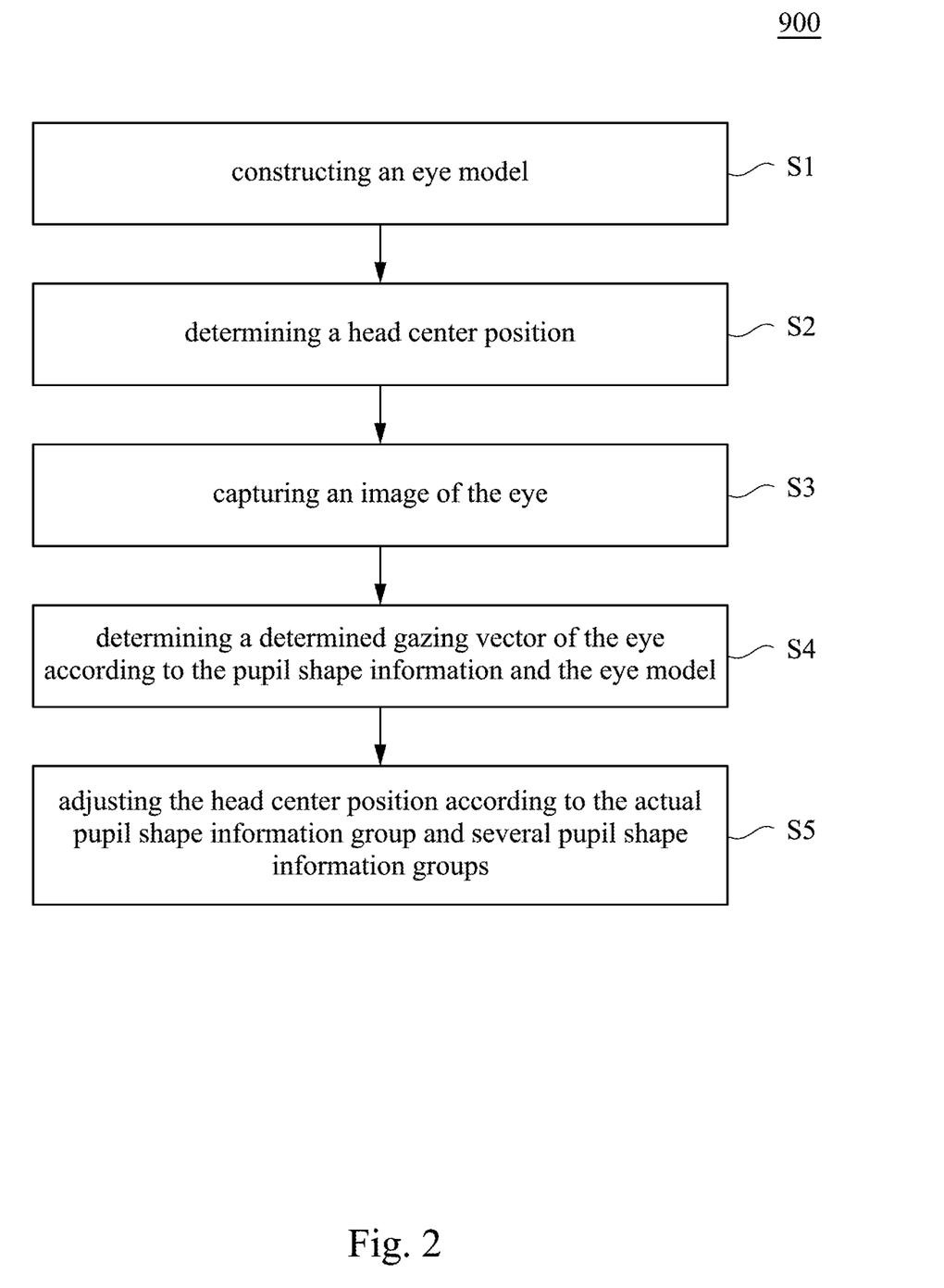
FIG. 2 is a flowchart illustrating the eye tracking method in accordance with some embodiments of the present disclosure.

Reference is made to FIG. 2. For better understanding of the present disclosure, the detailed operation of the electronic device 100 will be discussed in accompanying with the embodiments shown in FIG. 2. FIG. 2 is a flowchart illustrating the eye tracking method 900 in accordance with some embodiments of the present disclosure. It should be noted that the eye tracking method 900 can be applied to an electrical device having a structure that is the same as or similar to the structure of the electronic device 100 shown in FIG. 1. To simplify the description below, the embodiments shown in FIG. 1 will be used as an example to describe the eye tracking method 900 according to some embodiments of the present disclosure. However, the present disclosure is not limited to application to the embodiments shown in FIG. 1.

As shown in FIG. 2, the eye tracking method 900 includes operations S1 to S5. In operation S1, the processing circuit 110 is configured to construct an eye model.

Figure 3:
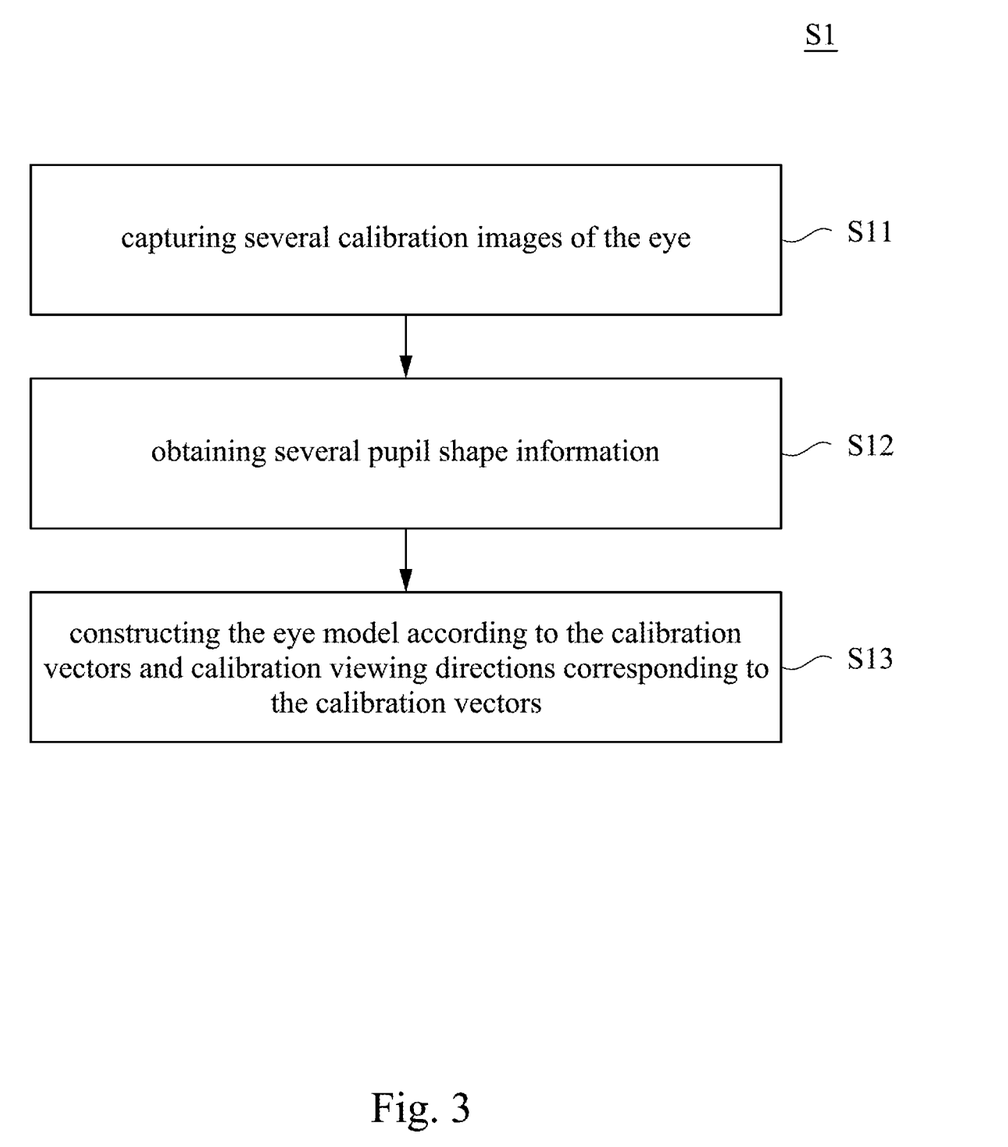
FIG. 3 is a flowchart illustrating the detailed operations in accordance with some embodiments of the present disclosure.

Reference is made to FIG. 3 together. FIG. 3 is a flowchart illustrating the detailed operations of the operation S1 in accordance with some embodiments of the present disclosure.

As shown in FIG. 3, in some embodiments, the operation S1 includes operations S11 to S13. In operation S11, the processing circuit 110 is configured to control the camera circuit 130 to capture several calibration images of the eye.

Figure 4A:
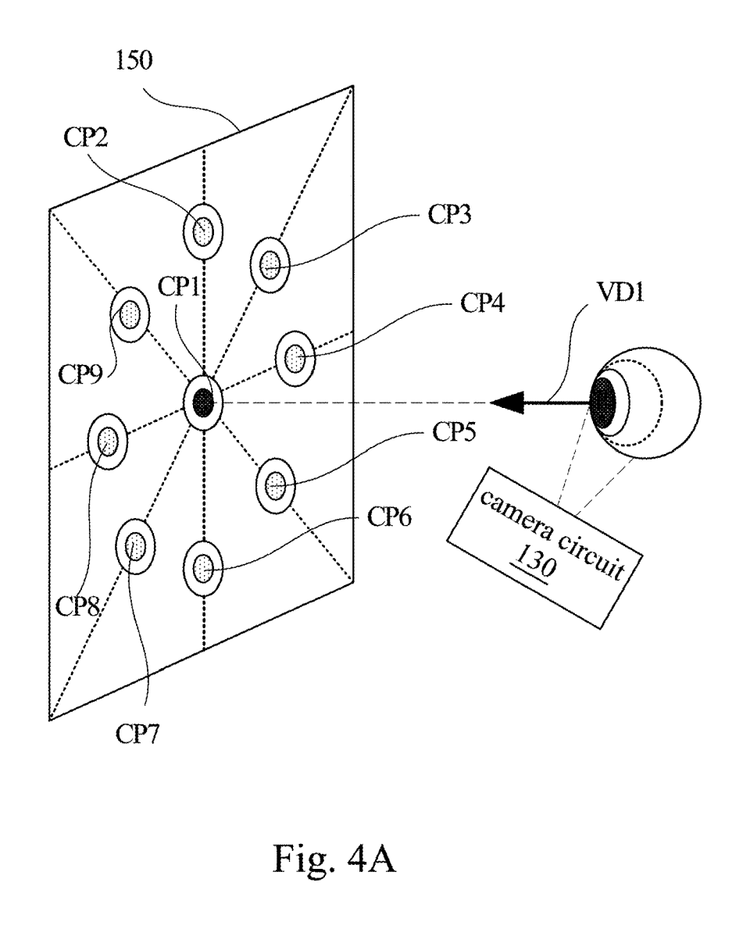
FIG. 4A and FIG. 4B are diagrams illustrating the operation of the electronic device according to some embodiments of the present disclosure.
Figure 4B:
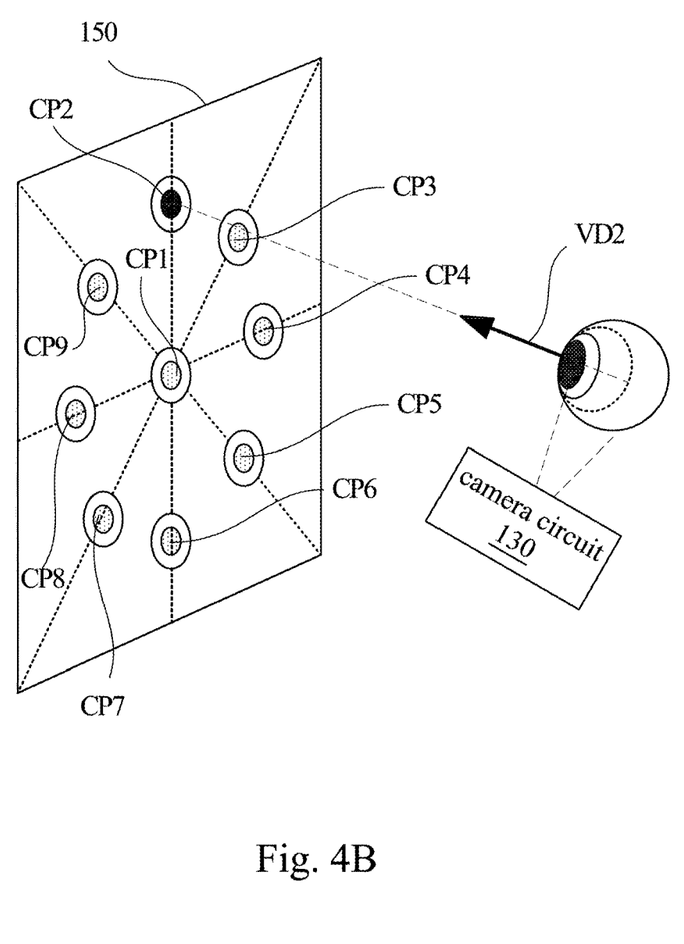

Reference is made to FIG. 4A and FIG. 4B. FIG. 4A and FIG. 4B are diagrams illustrating the operation of the electronic device 100 according to some embodiments of the present disclosure.

As shown in FIG. 4A and FIG. 4B, specifically, in operation S11, the processing circuit 110 may be configured to control the display circuit 150 to display calibration gazing points CP1-CP9 sequentially in multiple frames. The calibration gazing points CP1-CP9 correspond to multiple calibration viewing directions respectively.

For example, in the first frame as depicted in FIG. 4A, the display circuit 150 is displaying the corresponding calibration gazing point CP1, which corresponds to the calibration viewing direction VD1. In the next frame as depicted in FIG. 4B, the display circuit 150 is displaying the corresponding calibration gazing point CP2, which corresponds to the calibration viewing direction VD2, and so on.

Accordingly, the processing circuit 110 may be configured to control the camera circuit 130 to capture the calibration images of the eye in the multiple frames sequentially.

Next, in operation S12, the processing circuit 110 is configured to obtain several pupil shape information.

Specifically, the processing circuit 110 may perform feature extraction to the calibration images obtained in operation S11 in order to find the corresponding calibration pupil regions of interest. For example, image filtering may be performed to modify or enhance the image of the eye to emphasize the pupil features and/or remove other features, and reduce or eliminate the noise of the image. On the condition that there are two or more candidates in the image, the false targets may also be eliminated using proper image filtering methods.

In some embodiments, Haar-like features may be used to calculate the features in the image. Then, mean shift algorithm may be applied for image segmentation, and a center and a contour of the pupil in the image of the eye may be determined accordingly. In some other embodiments, machine learning/deep learning method related to computer vision may be applied to identify and determine the center and the contour of the pupil in the image of the eye. For example, Convolutional Neural Network (CNN) may be applied, but the present disclosure is not limited thereto.

Alternatively stated, in operation S12, the processing circuit 110 may be configured to determine the center of the pupil in the image of the eye, and determine the contour of the pupil in the image of the eye. Then, the processing circuit 110 may be configured to fit an ellipse to the pupil according to the center and the contour of the pupil, to obtain the calibration pupil region of interest.

Figure 5A:
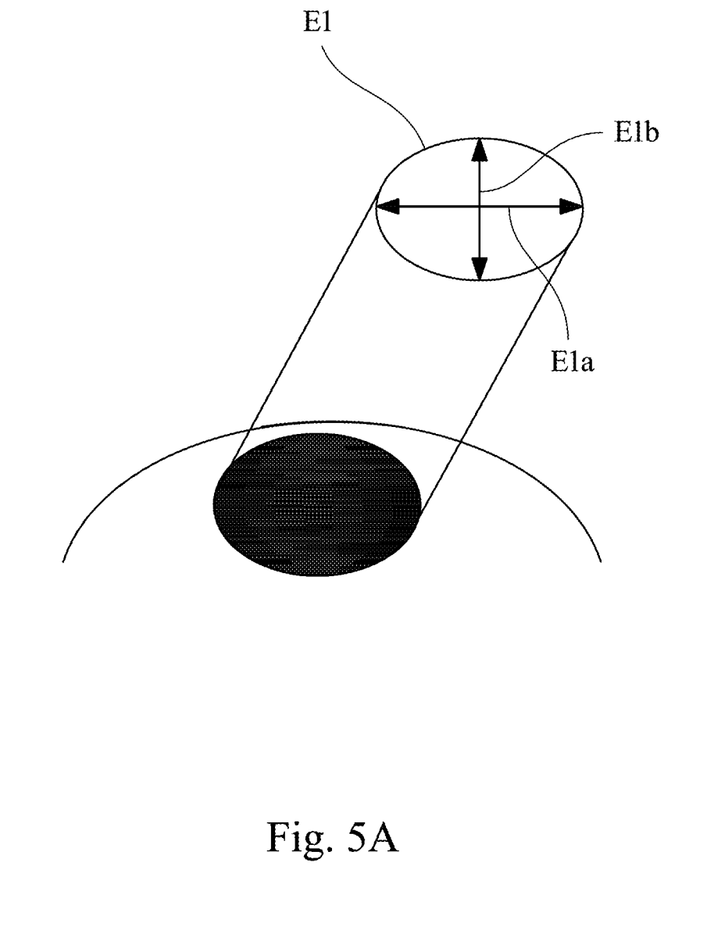
FIG. 5A and FIG. 5B are diagrams illustrating operations of the electronic device according to some embodiments of the present disclosure.
Figure 5B:
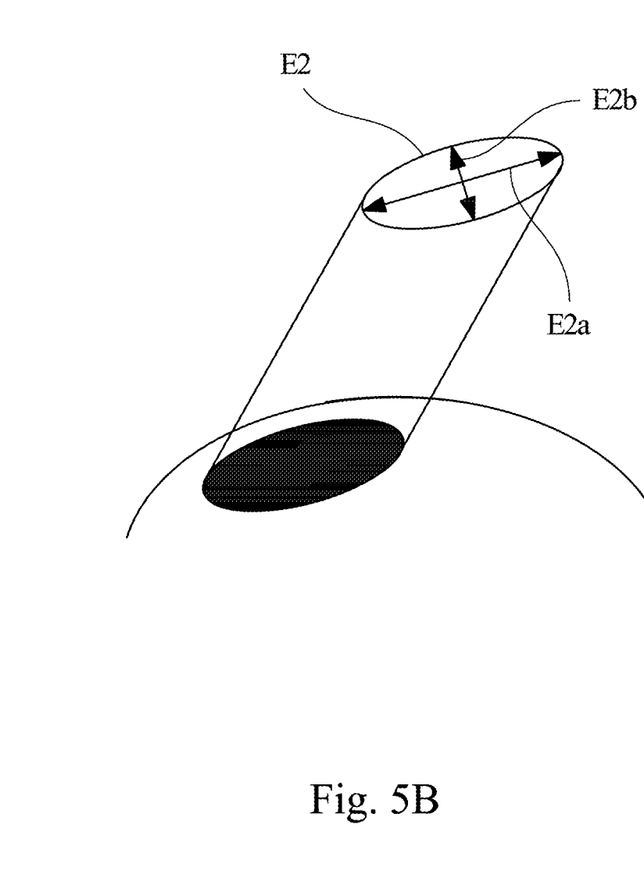

Reference is made to FIG. 5A and FIG. 5B. FIG. 5A and FIG. 5B are diagrams illustrating operations of the electronic device 100 according to some embodiments of the present disclosure. As shown in FIG. 5A and FIG. 5B, the calibration pupil regions of interest are fitted as ellipses E1, E2 with different center coordinates, with different rotation angles, and/or with different major axis E1a, E2a and minor axis E1b, E2b. Alternatively stated, when the user looks at different calibration viewing directions, different ellipses E1, E2 are fitted as the calibration pupil regions of interest. Accordingly, parameters of the major axis E1a, E2a and the minor axis E1b, E2b of the ellipses E1, E2 may be calculated and obtained to be the calibration vectors. In one embodiment, the calibration vectors can be realized by normal vectors of surfaces which are formed by the major axis E1a, E2a and the minor axis E1b, E2b of the ellipses E1, E2.

Therefore, after the calibration vectors are obtained, operation S13 may be performed. In operation S13, the processing circuit 110 is configured to construct the eye model according to the calibration vectors and calibration viewing directions corresponding to the calibration vectors. For example, the eye model may include a matrix indicating relationship between the viewpoint of the eye and the gazing vector of the pupil region of interest. Specifically, in some embodiments, a polynomial equation may be obtained to indicate the relationship between the ellipse parameters (e.g., major axis and the minor axis) and polar coordinates of the corresponding gazing points, which represent the viewing directions of the eye. The eye model may include the companion matrix of the polynomial equation to indicate the relationship thereof.

In some embodiments, the gazing vector including the major axis and the minor axis indicating a shape of the pupil region of interest may not be calculated in operation S1 so as to reduce the operational complexity of the processing circuit 110.

Accordingly, after the eye model is obtained in operation S1, eye tracking may be executed in the following operations S2-S5 as the user performs various interaction with the contents displayed in display circuit 150 while wearing the HMD device. Since the calibration of the eye model is performed in operation S1 to meet one or more users' specific pupil shape, the accuracy of eye tracking is improved.

Figure 6A:
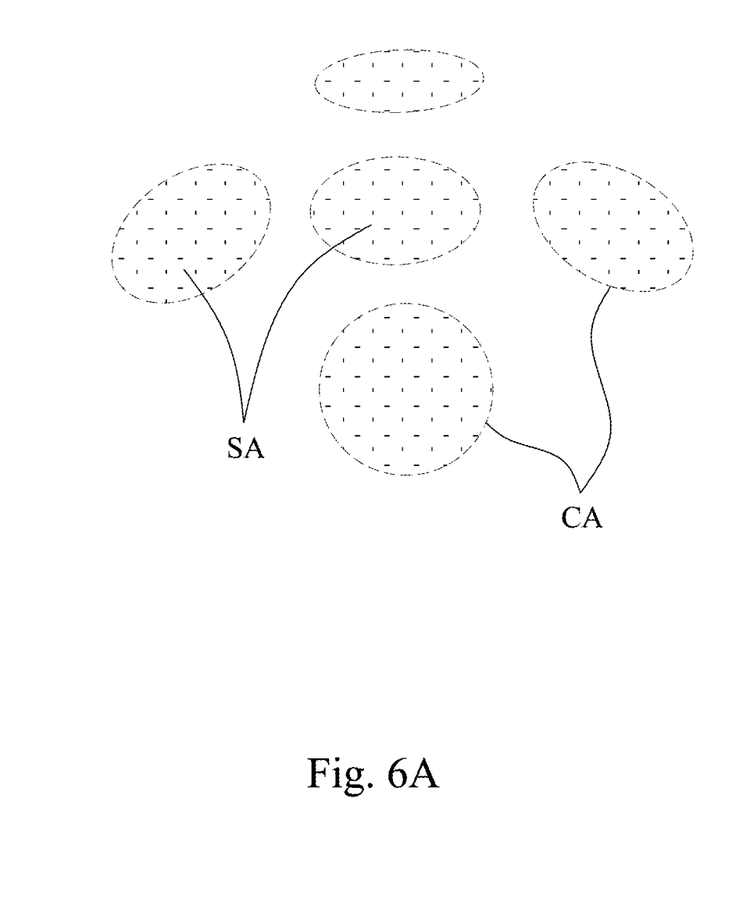
FIG. 6A and FIG. 6B are diagrams illustrating operations of the electronic device according to some embodiments of the present disclosure.
Figure 6B:
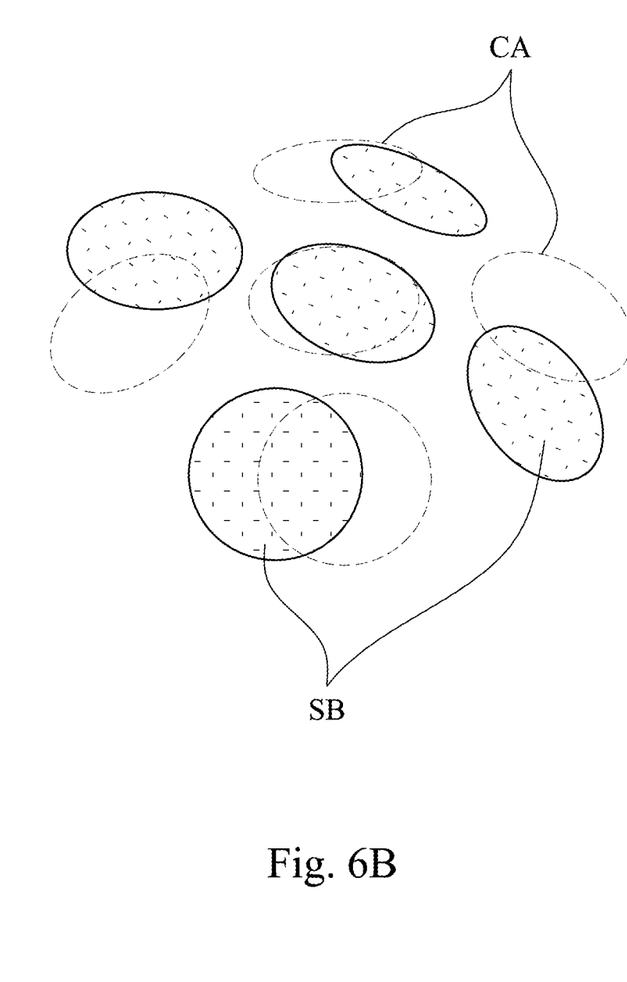

In operation S2, the processing circuit 110 is configured to determine a head center position. The head center position is determined according to a plurality of pupil shape information and the eye model. Reference is made to FIG. 6A and FIG. 6B. FIG. 6A and FIG. 6B are diagrams illustrating the operation of the electronic device 100 according to some embodiments of the present disclosure.

As shown in FIG. 6A and FIG. 6B, the dotted lined circles CA are the actual pupil shape information relative to the head center position of the user in reality. The shadowing circles SA and SB are the simulated pupil shape information relative to different head center positions of the user by simulation of the processing circuit 110 according to the eye model. Each of the shadowing circles SA and SB and the dotted lined circles CA includes five circles. Each of the five circles corresponds to one of the gazing points respectively. For example, the five circles may correspond to the gazing points CP1, CP2, CP4, CP6, and CP8 as illustrated in FIG. 4A respectively.

The processing circuit 110 calculates the similarity values between the actual pupil shape information and the simulated pupil shape information. The processing circuit 110 determines the simulated head center position with the highest similarity value as the actual head center position of the user. For example, as illustrated in FIG. 6A and FIG. 6B, assume that the shadowing circles SA are the simulated pupil shape information relative to the head center position h(x1, y1) of the user, and assume that the shadowing circles SB are the simulated pupil shape information relative to the head center position h(x2, y2) of the user. As shown in FIG. 6A and FIG. 6B, the similarity value between the shadowing circles SA and the dotted lined circles CA is higher than the similarity value between the shadowing circles SB and the dotted lined circles CA. If the similarity value between the shadowing circles SA and the dotted lined circles CA is the highest among the similarity values, the processing circuit 110 determines that the position h(x1, y1) as the actual head center position of the user and determines the position h(x1, y1) as the initial head center position of the user.

In operation S3, the processing circuit 110 is configured to control the camera circuit 130 to capture an image of the eye. Next, in operation S3, the processing circuit 110 is configured to detect a pupil region of interest in the image of the eye and obtains the pupil shape information of the eye according to the captured image. The operations of detecting the pupil region of interest are similar to the operations of detecting the calibration pupil region of interests in operation S1.

In operation S4, the processing circuit 110 is configured to determine a determined gazing vector of the eye according to the pupil shape information obtained in operation S3 and the eye model constructed in operation S1. For example, the processing circuit 110 may simulate different pupil shape information corresponds to different gazing points or gazing vectors at different head center positions. Based on the head center position, the processing circuit 110 determines the gazing point or the gazing vector of the eye, in which the similarity value between the pupil shape information of the determined gazing point or the determined gazing vector and the pupil shape information obtained in operation S3 is the highest.

In some embodiments, after the gazing vector is determined, the processing circuit 110 is configured to calculate a corresponding model between the determined gazing vector and the display circuit 150 according to the formulas below:

$$\begin{bmatrix} g_x \\ g_y \end{bmatrix} = \frac{1}{G_z} \begin{bmatrix} G_x \\ G_y \end{bmatrix}$$

$$\begin{bmatrix} S_x \\ S_y \end{bmatrix} = \begin{bmatrix} a_0 & a_1 & a_2 & a_3 & a_4 & a_5 \\ b_0 & b_1 & b_2 & b_3 & b_4 & b_5 \end{bmatrix} \begin{bmatrix} 1 \\ g_x \\ g_y \\ g_x \times g_y \\ g_x^2 \\ g_y^2 \end{bmatrix}$$

"G" represents gazing vector. "g" represents normalized gazing vector. "S" is the points of screen. "a" and "b" are the weights.

In operation S5, the processing circuit 110 is configured to adjust the head center position according to the actual pupil shape information group and a plurality of simulated pupil shape information groups.

Figure 7:
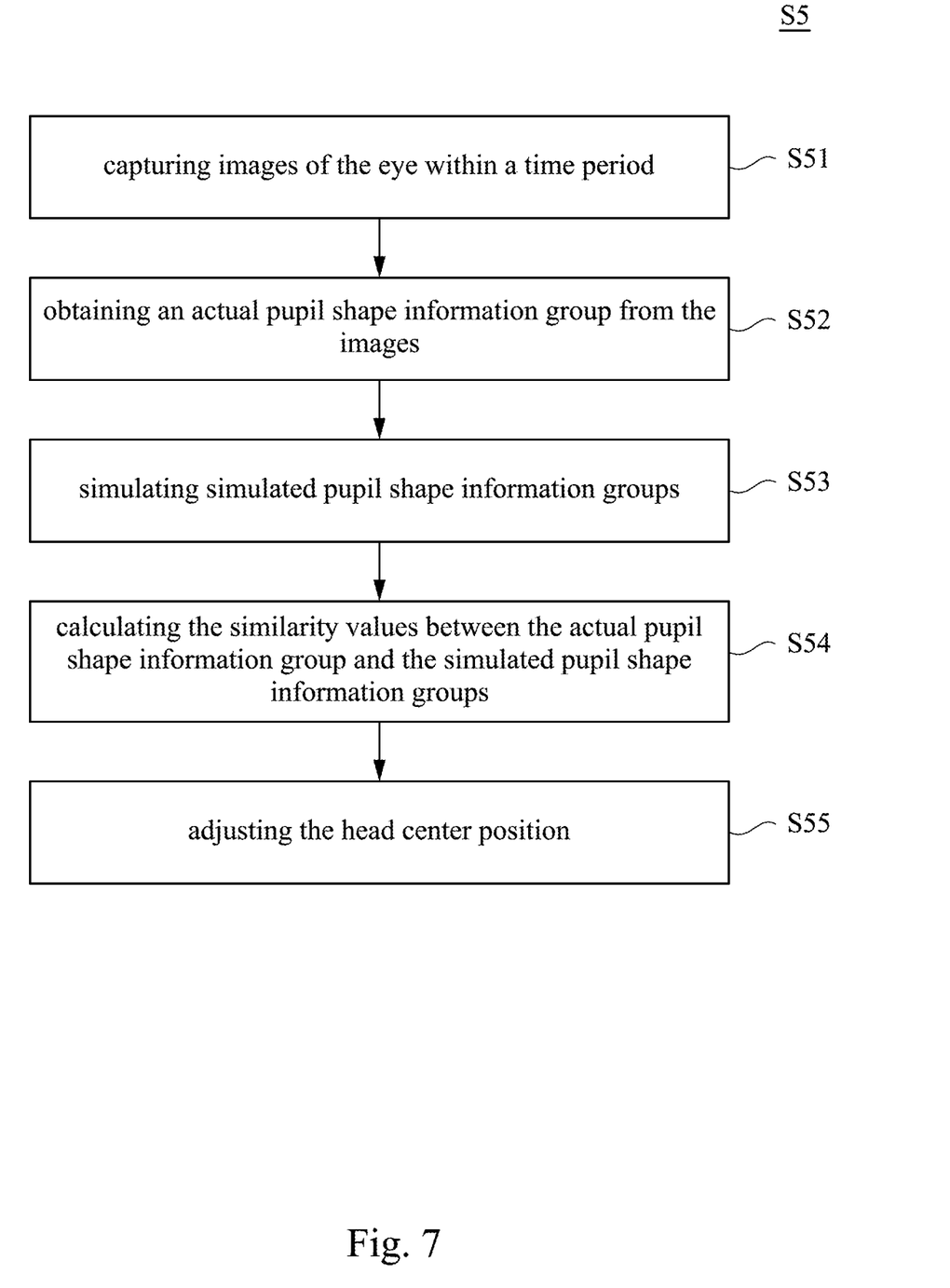
FIG. 7 is a flowchart illustrating detailed operations in accordance with some embodiments of the present disclosure.

Reference is made to FIG. 7 together. FIG. 7 is a flowchart illustrating the detailed operations of the operation S5 in accordance with some embodiments of the present disclosure. Operation S5 includes operations S51 to S55.

In operation S51, the camera circuit 130 is configured to capture several images of the eye within a time period. For example, the camera circuit 130 captures an image of the eye every 0.1 second, and the camera circuit 130 takes 10 images of the eye within one minute.

In operation S52, the processing circuit 110 is configured to obtain an actual pupil shape information group from the images, in which the images correspond to a plurality of gazing vectors.

In operation S53, the processing circuit 110 is configured to simulate a plurality of simulated pupil shape information groups, in which the simulated pupil shape information groups correspond to a plurality of simulated head center positions. Each of the simulated head center positions is a unit distance away from the previously stored head center position or the previously determined head center position. For example, if the previously determined head center position is h(x, y, z). The processing circuit 110 may simulate the pupil shape information groups corresponding to the simulated head center positions h(x+1, y, z), h(x−1, y, z), h(x, y+1, z), h(x, y−1, z), h(x, y, z+1), h(x, y, z−1). That is, the head center positions corresponding to the simulated pupil shape information groups are a unit distance away from the previously stored head center position. It should be noted that, the unit distance of 1 is for illustrative purposes only, and the embodiments of the present disclosure are not limited thereto.

Figure 8A:
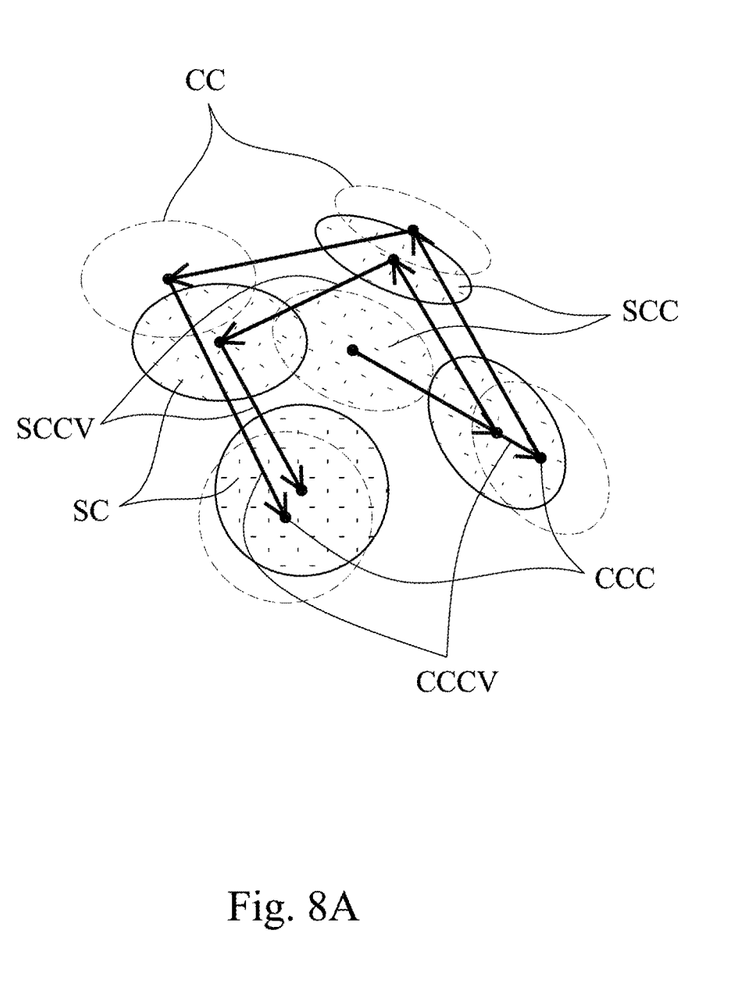
FIG. 8A and FIG. 8B are diagrams illustrating operations of the electronic device according to some embodiments of the present disclosure.
Figure 8B:
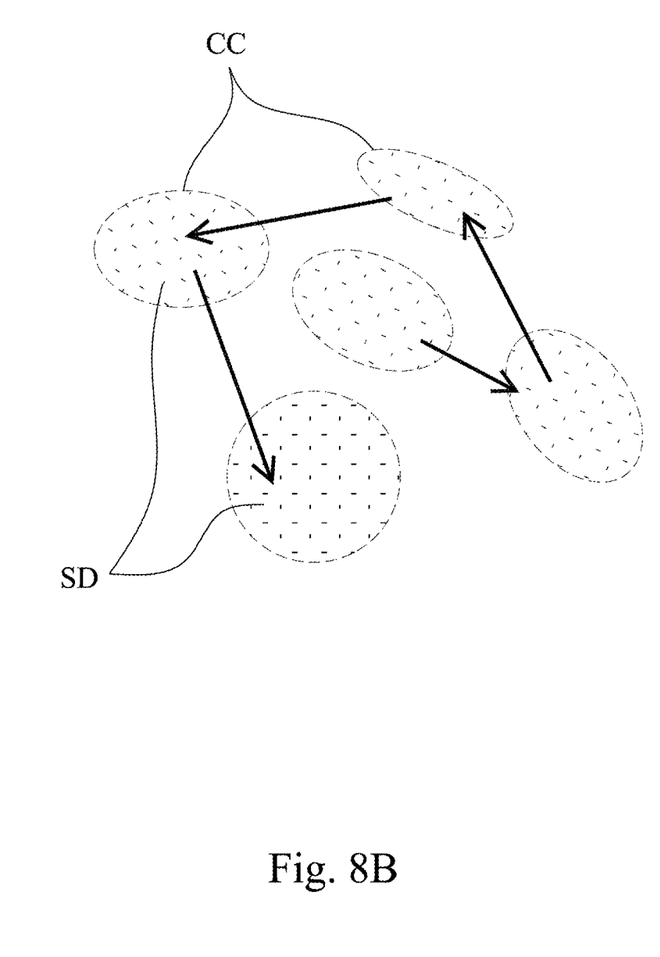

Reference is made to FIG. 8A and FIG. 8B together. FIG. 8A and FIG. 8B are diagrams illustrating the operation of the electronic device 100 according to some embodiments of the present disclosure. As shown in FIG. 8A and FIG. 8B, the dotted lined circles CC are the actual pupil shape information relative to the head center position of the user in reality. The processing circuit 110 may analyze the images obtained in operation S51 to obtain the pupil shape information groups. The shadowing circles SC and SD are the simulated pupil shape information relative to different head center positions of the user by simulation of the processing circuit 110 according to the eye model. Each of the shadowing circles SC and SD and the dotted lined circles CC includes five circles. Each of the five circles corresponds to one of the gazing points respectively.

In details, the processing circuit 110 may analyze the gazing vectors of the eye according to several images captured within a time period in operation S51. During simulation, the processing circuit 110 may simulate the pupil shape information according to the analyzed gazing vectors and the simulated head center positions.

In operation S54, the processing circuit 110 is configured to calculate the similarity values between the actual pupil shape information group and the simulated pupil shape information groups. Reference is made to FIG. 8A and FIG. 8B. Assume that the previously determined head center position is h(x, y, z). Assume that the shadowing circles SC are the simulated pupil shape information group relative to the simulated head center position h(x, y, z). The shadowing circles SD are the simulated pupil shape information group relative to the head center position h(x+1, y, z). The processing circuit 110 calculates the similarity value between the actual pupil shape information group and the simulated pupil shape information group, in which the simulated pupil shape information group corresponds to the simulated head center position h(x, y, z). The processing circuit 110 also calculates the similarity value between the actual pupil shape information group and the simulated pupil shape information group, in which the simulated pupil shape information group corresponds to the simulated head center position h(x+1, y, z).

In operation S55, the processing circuit 110 is configured to adjust the head center position. The processing circuit 110 determines one of the simulated head center positions, in which corresponds to the simulated pupil shape information group with the highest similarity value. The processing circuit 110 adjusts the determined head center position to be the one of the simulated head center positions with the highest similarity value. Reference is made to FIG. 8A and FIG. 8B again. It may be known from FIG. 8A and FIG. 8B that the similarity value between the shadowing circles SD, corresponding to the simulated head center position h(x+1, y, z), and the dotted lined circles CC, corresponding to the actual head center position, is the highest. The processing circuit 110 adjusts the determined head center position to be the simulated head center position h(x+1, y, z).

It should be noted that, in operation S5, the processing circuit 110 may only utilize the position of the pupil center of the pupil shape information. That is, the processing circuit 110 does not need to extract the major axis and the minor axis of the eye.

Reference is made to FIG. 8A again. For example, the processing circuit 110 may follow the positions of the actual pupil centers CCC and extracts the actual pupil center vectors CCCV between the actual pupil centers CCC. The actual pupil center vectors CCCV represent the movement of the pupil center in sequential. The processing circuit 110 simulates the positions of the simulated pupil centers SCC and calculated the simulated pupil center vectors SCCV in sequential. The simulated pupil centers SCC are simulated by assuming the simulated head center position to be at the position of h(x, y, z) and assuming that the gazing vectors are the same as those of the actual gazing vectors of the dotted lined circles CC. The processing circuit 110 then calculates the similarity value between the actual pupil center vectors CCCV and the simulated pupil center vectors SCCV.

In some other embodiments, the processing circuit 110 utilizes the variation of the angular of the pupil shape information groups in operation S5. The processing circuit 110 may utilize the variation of one of the parameters of the pupil shape information in operation S5 to calculate the similarity value. That is, the processing circuit 110 does not have to analyze several parameters, such as the angular, the radius, the major axis, the minor axis, etc., of the pupil shape information during the operation S5 when calculating the parameters, in which the operational complexity of the processing circuit 110 may be reduced.

Moreover, the time period as mentioning in operation S51 may be adjusted dynamically. If the movement of the head center position is intense, the movement value of the actual pupil shape information group may be high over a short time period. For example, the total amount of actual pupil center vectors CCCV may be higher than a threshold value within a short period time. In this situation, the time period of obtaining the actual images of the eye may be adjusted to be shorter. On the contrary, if the head center position is not moving basically, the time period of obtaining the actual images of the eye may be adjusted to be longer.

Accordingly, the rotation and the movement of the head of the user may be taken into account and may be updated in real-time during the eye tracking.

It is noted that the head center position calibration process discussed above may also be applied other eye tracking method, such as a Pupil Center-Corneal Reflection (PCCR) eye tracking method, in which the eye model may be obtained in various ways.

Through the operations of various embodiments described above, an eye tracking method with the head center position calibration process is implemented to realize the eye tracker for the application in the VR, AR or MR and increase the accuracy of eye tracking, which brings a smoother user experience for the user wearing the HMD to interact with the object in the VR, AR or MR environment.

It is noted that the above embodiments are simplified for better understanding of the present disclosure. It should be noted that, in some embodiments, the eye tracking method 900 may be implemented as a computer program. When the computer program is executed by a computer, an electronic device, or the processing circuit 110 in FIG. 1, this executing device performs the eye tracking method 900. The computer program can be stored in a non-transitory computer readable storage medium such as a ROM (read-only memory), a flash memory, a floppy disk, a hard disk, an optical disc, a flash disk, a flash drive, a tape, a database accessible from a network, or any storage medium with the same functionality that can be contemplated by persons of ordinary skill in the art to which this disclosure pertains.

In addition, it should be noted that in the operations of the abovementioned eye tracking method 900, no particular sequence is required unless otherwise specified. Moreover, the operations may also be performed simultaneously or the execution times thereof may at least partially overlap.

Furthermore, the operations of the eye tracking method 900 may be added to, replaced, and/or eliminated as appropriate, in accordance with various embodiments of the present disclosure.

Various functional components or blocks have been described herein. As will be appreciated by persons skilled in the art, the functional blocks will preferably be implemented through circuits (either dedicated circuits, or general purpose circuits, which operate under the control of one or more processors and coded instructions), which will typically include transistors or other circuit elements that are configured in such a way as to control the operation of the circuitry in accordance with the functions and operations described herein. As will be further appreciated, the specific structure or interconnections of the circuit elements will typically be determined by a compiler, such as a register transfer language (RTL) compiler. RTL compilers operate upon scripts that closely resemble assembly language code, to compile the script into a form that is used for the layout or fabrication of the ultimate circuitry. Indeed, RTL is well known for its role and use in the facilitation of the design process of electronic and digital systems.

Although the present disclosure has been described in considerable detail with reference to certain embodiments thereof, other embodiments are possible. Therefore, the scope of the appended claims should not be limited to the description of the embodiments contained herein.

What is claimed is:

1. An eye tracking method comprising:
   constructing, by a processing circuit, an eye model;
   analyzing, by the processing circuit, a first head center position, according to a plurality of first pupil shape information and the eye model, wherein the plurality of first pupil shape information correspond to a plurality of first gazing vectors;
   capturing, by a camera circuit, a first image of the eye;
   analyzing, by the processing circuit, a determined gazing vector, according to the eye model and the first image; and
   adjusting, by the processing circuit, the first head center position according to an actual pupil shape information group and a plurality of simulated pupil shape information groups.

2. The eye tracking method of claim 1, wherein the plurality of simulated pupil shape information groups correspond to a plurality of second head center positions, and each of the plurality of second head center positions is a unit distance away from the first head center position.

3. The eye tracking method of claim 2, further comprising:
   calculating a plurality of similarity values between the plurality of simulated pupil shape information and the actual pupil shape information;
   determining one of the second head center positions, wherein the one of the second head center positions correspond to the highest one of the plurality of similarity values; and
   determining the one of the second head center positions to be the first head center position.

4. The eye tracking method of claim 1, further comprising:
   capturing, by the camera circuit, a plurality of second images of the eye within a time period, wherein the plurality of second images correspond to a plurality of second pupil shape information; and
   constructing, by the processing circuit, the actual pupil shape information group.

5. The eye tracking method of claim 1, further comprising:
   capturing, by the camera circuit, a plurality of second images of the eye, wherein the plurality of second images correspond to a plurality of calibration points; and obtaining, by the processing circuit, a plurality of second pupil shape information according to the second images, to construct the eye model.

6. The eye tracking method of claim 5, further comprising:
obtaining a third pupil shape information from the first image;
calculating a plurality of similarity values between the third pupil shape information and the plurality of second pupil shape information;
determining the determined gazing vector according to the plurality of similarity values, wherein the determined gazing vector is corresponding to the one of the second pupil shape information with the highest one of the plurality of similarity values.

7. The eye tracking method of claim 1, further comprising:
calculating a corresponding model between the determined gazing vector and a display circuit according to the determined gazing vector.

8. The eye tracking method of claim 1, further comprising:
capturing the plurality of first pupil shape information corresponding to an actual head center position;
calculating a plurality of similarity values between the plurality of first pupil shape information and a plurality of simulated pupil shape information, wherein the plurality of simulated pupil shape information correspond to a plurality of simulated head center positions; and
determining one of the simulated head center positions to be the first head center position, wherein the one of the simulated head center positions corresponds to a highest one of the plurality of similarity values.

9. An electronic device, comprising:
a camera circuit;
a processing circuit electrically connected to the camera circuit;
a memory electrically connected to the processing circuit; and
one or more programs, wherein the one or more programs are stored in the memory and configured to be executed by the processing circuit, the one or more programs comprising instructions for:
constructing an eye model;
analyzing a first head center position according to a plurality of first pupil shape information and the eye model, wherein the plurality of first pupil shape information correspond to a plurality of first gazing vectors;
controlling the camera circuit to capture a first image of the eye;
analyzing a determined gazing vector according to the eye model and the first image; and
adjusting the first head center position according to an actual pupil shape information group and a plurality of simulated pupil shape information groups.

10. The electronic device as claimed in claim 9, wherein the plurality of simulated pupil shape information groups correspond to a plurality of second head center positions, and each of the plurality of second head center positions is a unit distance away from the first head center position.

11. The electronic device as claimed in claim 10, wherein the one or more programs further comprise instructions for:
calculating a plurality of similarity values between the plurality of simulated pupil shape information and the actual pupil shape information;
determining one of the second head center positions, wherein the one of the second head center positions correspond to the highest one of the plurality of similarity values; and
determining the one of the second head center positions to be the first head center position.

12. The electronic device as claimed in claim 9, wherein the one or more programs further comprise instructions for:
controlling the camera circuit to capture a plurality of second images of the eye within a time period, wherein the plurality of second images correspond to a plurality of second pupil shape information; and
constructing the actual pupil shape information group.

13. The electronic device as claimed in claim 9, wherein the one or more programs further comprise instructions for:
controlling the camera circuit to capture a plurality of second images of the eye, wherein the plurality of second images correspond to a plurality of calibration points; and
obtaining a plurality of second pupil shape information according to the second images, to construct the eye model.

14. The electronic device as claimed in claim 13, wherein the one or more programs further comprise instructions for:
obtaining a third pupil shape information from the first image;
calculating the third pupil shape information and a plurality of similarity values between the third pupil shape information and the plurality of second pupil shape information;
determining the determined gazing vector according to the plurality of similarity values, wherein the determined gazing vector is corresponding to the one of the second pupil shape information with the highest one of the plurality of similarity values.

15. The electronic device as claimed in claim 9, wherein the one or more programs further comprise instructions for:
calculating a corresponding model between the determined gazing vector and a display circuit according to the determined gazing vector.

16. The electronic device as claimed in claim 9, wherein the one or more programs further comprise instructions for:
controlling the camera circuit to capture the plurality of first pupil shape information corresponding to an actual head center position;
calculating a plurality of similarity values between the plurality of the first pupil shape information and a plurality of simulated pupil shape information, wherein the plurality of simulated pupil shape information correspond to a plurality of simulated head center position; and
determining one of the simulated head center position to be the first head center position, wherein the one of the simulated head center position corresponds to a highest one of the plurality of similarity values.

17. A non-transitory computer readable storage medium storing one or more programs, comprising instructions, which when executed, causes a processing circuit to perform operations comprising:
constructing an eye model;
analyzing a first head center position according to a plurality of first pupil shape information and the eye model, wherein the plurality of first pupil shape information correspond to a plurality of first gazing vectors;
controlling a camera circuit to capture a first image of the eye;

analyzing a determined gazing vector according to the eye model and the first image; and adjusting the first head center position according to an actual pupil shape information group and a plurality of simulated pupil shape information groups.

18. The non-transitory computer readable storage medium as claimed in claim 17, wherein the plurality of simulated pupil shape information groups correspond to a plurality of second head center positions, and each of the plurality of second head center positions is a unit distance away from the first head center position.

19. The non-transitory computer readable storage medium as claimed in claim 18, further comprising instructions, which when executed, causes the processing circuit to further perform operations comprising:

calculating a plurality of similarity values between the plurality of simulated pupil shape information and the actual pupil shape information;

determining one of the second head center positions, wherein the one of the second head center positions correspond to the highest one of the plurality of similarity values; and determining the one of the second head center positions to be the first head center position.

20. The non-transitory computer readable storage medium as claimed in claim 17, further comprising instructions, which when executed, causes the processing circuit to further perform operations comprising:

controlling the camera circuit to capture a plurality of second images of the eye within a time period, wherein the plurality of second images correspond to a plurality of second pupil shape information; and constructing the actual pupil shape information group.

* * * * *